United States Patent
Dowling et al.

(10) Patent No.: US 12,273,587 B2
(45) Date of Patent: Apr. 8, 2025

(54) USE CASE CONFIGURATION SYSTEM AND METHOD

(71) Applicant: ThinkAnalytics Ltd., Lanarkshire (GB)

(72) Inventors: Richard Dowling, Glasgow (GB); Bryan Bossard, Canyon Country, CA (US); Peter Docherty, Glasgow (GB); Christopher McGuire, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 215 days.

(21) Appl. No.: 18/140,099

(22) Filed: Apr. 27, 2023

(65) Prior Publication Data

US 2024/0364965 A1 Oct. 31, 2024

(51) Int. Cl.
*H04N 21/442* (2011.01)
*H04N 21/258* (2011.01)

(52) U.S. Cl.
CPC .. *H04N 21/44213* (2013.01); *H04N 21/25891* (2013.01); *H04N 21/44204* (2013.01)

(58) Field of Classification Search
CPC ....... H04N 21/44213; H04N 21/25891; H04N 21/44204
See application file for complete search history.

(56) References Cited

U.S. PATENT DOCUMENTS

| | | |
|---|---|---|
| 6,567,814 B1 | 5/2003 | Bankier et al. |
| 7,805,129 B1 | 9/2010 | Issa et al. |
| 9,699,491 B1 | 7/2017 | Docherty et al. |
| 9,756,390 B1 | 9/2017 | Docherty et al. |
| 9,906,837 B1 | 2/2018 | Docherty et al. |
| 9,973,797 B1 | 5/2018 | Docherty et al. |
| 10,091,555 B1 | 10/2018 | Docherty et al. |
| 10,289,739 B1 | 5/2019 | Docherty et al. |
| 10,356,035 B1 | 7/2019 | Gravino et al. |
| 10,412,454 B2 | 9/2019 | Docherty et al. |
| 11,212,584 B2 | 12/2021 | Docherty et al. |
| 11,343,573 B2 | 5/2022 | Docherty et al. |
| 2003/0106064 A1 | 6/2003 | Plourde |
| 2004/0163103 A1* | 8/2004 | Swix ............... H04H 60/33 725/23 |

(Continued)

FOREIGN PATENT DOCUMENTS

| | | |
|---|---|---|
| EP | 1 317 143 A1 | 6/2003 |
| EP | 2 207 348 A2 | 7/2010 |

(Continued)

*Primary Examiner* — Oschta I Montoya
(74) *Attorney, Agent, or Firm* — Foley & Lardner LLP

(57) ABSTRACT

A method, system and computer program product for determining use cases for a content selection interface that provides user selectable indications of content available from a content provider according to the use cases. The indications of available content are selectable by a user to have the content provided to the user by the content provider. The method comprises, using a computing system: accessing, from at least one computer readable data store, historical data representing previous user actions of a plurality of users using a content selection interface; identifying, using the computing system, one or more attributes associated with the user actions from the historical data; and using the identified attributes to configure one or more use cases for providing indications of available content on the content selection interface.

17 Claims, 7 Drawing Sheets

(56) References Cited

U.S. PATENT DOCUMENTS

| | | |
|---|---|---|
| 2007/0157222 A1 | 7/2007 | Cordray et al. |
| 2008/0304812 A1 | 12/2008 | Jin |
| 2010/0005492 A1 | 1/2010 | Takano et al. |
| 2010/0070507 A1 | 3/2010 | Mori |
| 2011/0243529 A1 | 10/2011 | Oryoji et al. |
| 2014/0149344 A1 | 5/2014 | Pudipeddi et al. |
| 2014/0279756 A1 | 9/2014 | Whitman |
| 2015/0020126 A1* | 1/2015 | Kegel ................ H04N 21/4667 725/87 |
| 2015/0082330 A1 | 3/2015 | Yun et al. |
| 2015/0100987 A1 | 4/2015 | Whitman et al. |
| 2015/0269488 A1 | 9/2015 | Galai et al. |
| 2017/0311015 A1 | 10/2017 | Docherty et al. |
| 2018/0052851 A1* | 2/2018 | Lewis .................. H04N 21/431 |
| 2020/0252690 A1 | 8/2020 | Docherty et al. |
| 2022/0245013 A1* | 8/2022 | Ciabarra, Jr. ....... G06F 11/3438 |
| 2024/0357214 A1* | 10/2024 | Fuchs .................... H04N 21/84 |

FOREIGN PATENT DOCUMENTS

| | | |
|---|---|---|
| GB | 2 574 581 A | 12/2019 |
| WO | WO-01/15449 A1 | 3/2001 |
| WO | WO-02/27526 A1 | 4/2002 |
| WO | WO-2008/042242 A2 | 4/2008 |
| WO | WO-2013/130834 A1 | 9/2013 |
| WO | WO-2013/186061 A1 | 12/2013 |

\* cited by examiner

Use Case Id: War Movies    Client type: 103

USE CASE CONFIGURATION SYSTEM AND METHOD

FIELD

The present disclosure relates to a system and corresponding method for determining and/or configuring use cases that govern content selected for display on a content selection interface of a content provider.

BACKGROUND

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to technical developments to enable users to better access and select content, for example developments to electronic programme guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers.

Content providers can curate use cases that define what content can be selected to form groups of content for presentation in EPGs or other content selection user interfaces. In this case, a content provider can create the use case that can be used to determine a corresponding group of content and, once released, can analyse performance of the content. However, by the point that insights into the performance of that use case have been received, a considerable amount of development work may have gone into producing that use case, which may be wasted if the content determined by the use case is not well utilised by users. As such, it may be beneficial to improve existing "try it and see" processes for creating and configuring use cases that define what content can be selected to form corresponding groups of content for providing to users on a content selection interface.

SUMMARY

The following are provided as examples of the present disclosure.

According to a first example of the present disclosure is a method for determining use cases for a content selection interface that provides user selectable indications of content available from a content provider according to the use cases, the indications of available content being selectable by a user to have the content provided to the user by the content provider, the method comprising, using a computing system:

accessing, from at least one computer readable data store, historical data representing previous user actions of a plurality of users using a content selection interface;

identifying, using the computing system, one or more attributes associated with the user actions from the historical data; and using the identified attributes to configure one or more use cases for providing indications of available content on the content selection interface.

At least one of the attributes may comprise one or more values of one or more parameters of one or more use cases associated with one or more of the user actions represented in the historical data. The method may further comprise identifying, using the computing system, one or more use cases from the plurality of use cases that are associated with at least one of the user actions. The configuring of the one or more use cases may comprise using the one or more values of the one or more parameters of the one or more use cases identified to be associated with at least one of the user actions to configure the parameters of the one or more use cases for subsequently providing indications of available content on the content selection interface.

At least one of the attributes may comprise one or more or each of: metadata associated with the at least one user action; and/or an identification of, or other data regarding, the content giving rise to the at least one user action.

Each use case may comprise a plurality of parameters, the values of which at least partly define content of the use case. The configuring of the use cases may comprise using the identified attributes to select a value of at least one parameter of at least one of the use cases to be configured.

The configuring of the use cases using the identified attributes may comprise configuring the use cases using a model. The model may receive one or both of: the user actions from the historical data and/or the one or more attributes of the user actions from the historical data. The model may be configured to output, based at least in part on the user actions from the historical data and/or the one or more attributes of the user actions from the historical data, one or both of: indications of the use cases and/or values of parameters of the use cases to be configured. The model may comprise a machine learning model. The method may comprise training or otherwise configuring the machine learning model and/or selecting parameters thereof using at least some of the user actions and/or the attributes.

The user actions may comprise an action taken by a user using the content selection interface that relates to one or more items of content of a use case. Examples of user actions may include one or more or each of: selecting content associated with one or more use cases; scrolling through content associated with one or more use cases; hovering a cursor for greater than a threshold period over content associated with one or more use cases; pausing scrolling for greater than a threshold period through content associated with one or more use cases displayed on a user interface; downloading content that is associated with one or more use cases; having watched at least part of content that is associated with one or more use cases; bookmarking content that is associated with one or more use cases; browsing content that is associated with one or more use cases; recording content that is associated with one or more use cases; adding content that is associated with one or more use cases to virtual shopping basket or otherwise selecting for purchase or potential purchase; watching or listening to a trailer for content that is associated with one or more use cases; playing content that is associated with one or more use cases on a user device; purchasing content that is associated with one or more use cases; clicking on or otherwise selecting content that is associated with one or more use cases from a list of search results; remotely recording content that is associated with one or more use cases; setting a reminder for content that is associated with one or more use cases; liking, making a favorite or otherwise adding to a list content that is associated with one or more use cases; disliking content that is associated with one or more use cases; messaging about content that is associated with one or more use cases; posting on social media about content that is associated with one or more use cases; playing purchased content that is associated with one or more use cases; stopping watching or playing content that is associated with one or more use cases; and/or rating content that is associated with one or more use cases, from amongst others.

The method may comprise selecting, scoring, rating or ranking use cases, or the values of parameters thereof, depending on if, or to what extent, each use case meets one or more target criteria. At least one of the criteria may comprise how many of the user actions represented in the historical data are associated with a use case having a parameter value in common, or otherwise associated with, the respective use case. At least one of the criteria may comprise how long users interacted with a use case or content associated with a use case. At least one of the criteria may comprise how many advertising slots associated with a use case or the content thereof were interacted with. Other examples of criteria could be used and the disclosure is not limited to these.

The method may comprise providing a recommendation of one or more highest scoring, rated or ranked use cases from amongst a plurality of use cases to a user of a UX engine for configuring content selection interfaces. The method may comprise automatically selecting one or more highest scoring, rated or ranked use cases from amongst a plurality of use cases for use in a content selection interface. The method may comprise automatically setting parameters of a use case based at least in part on the parameters of one or more of the highest scored, rated or ranked use cases. The method may comprise using a machine learning model to determine one or more best performing use cases from the user actions represented in the historical data and/or the attributes thereof.

The method may comprise identifying data from the historical data for a first time period and data from the historical data for a second time period, wherein the first time period precedes the second time period. The configuring of the use cases may comprise using the use cases identified to be associated with at least some of the user actions of the first time period or the values of the parameters thereof to configure one or more use cases or the values of the parameters thereof and/or a content recommendation engine. The method may comprise using at least some of the user actions of the second time period to asses performance of the configured use cases or the values of the parameters thereof determined using the data from the first time period.

The providing of the historical data may comprise performing a wind-back or time-travel that comprises using only user action data, parameters and content recommendation models available during, or at the end of, the first time period. The database may be a relational database, with at least one of: user action data, parameters and/or content recommendation models provided for a plurality of dates and/or times. The user action data may be date and/or time stamped and the method comprises performing a wind-back to only use user action data, parameters and content recommendation models dated and/or time stamped for a date and/or time during, or at the end of, the first time period.

The content selection interface may be a carousel based interface comprising a plurality of carousels. Each carousel may comprise a plurality of indications of selectable content selected using a different one of the configured use cases. The content selection interface may be such that selecting an indication of content, e.g. using a user input device such as a touch screen or pointer, may provide the content.

According to a second example of the present disclosure is a system comprising a processor system configured to access, from at least one computer readable data store, historical data representing previous user actions of a plurality of users using a content selection interface. The processor system may be configured to access, from at least one computer readable data store, use case data defining a plurality of use cases. The processor system may be configured to identify use cases from the plurality of use cases associated with at least some of the user actions. The processor system may be configured to use the use cases identified to be associated with at least some of the user actions to configure use cases for providing indications of available content on the content selection interface.

The at least one of the attributes may comprise one or more values of one or more parameters of one or more use cases associated with at least one of the user actions represented in the historical data. The processor system may be configured to identify one or more use cases from the plurality of use cases that are associated with at least one of the user actions. The configuring of the one or more use cases may comprise using the one or more values of the one or more parameters of the one or more use cases identified to be associated with at least one of the user actions to configure the parameters of the one or more use cases for subsequently providing indications of available content on the content selection interface.

At least one of the attributes may comprise metadata associated with the at least one user action. At least one of the attributes may comprise an identification of, or other data regarding, the content giving rise to the at least one user action.

Each use case may comprise a plurality of parameters, the values of which at least partly define content of the use case. The configuring of the use cases may comprise using the identified attributes to select the at least one value of at least one parameter of at least one of the use cases to be configured.

The configuring of the use cases using the identified attributes may comprise configuring the use cases using a model. The model may receive one or both of: the user actions and/or the one or more attributes of the user actions from the historical data. The model may be configured to output, based at least in part on the user actions and/or the one or more attributes of the user actions from the historical data, one or both of: indications of the use cases and/or values of parameters of the use cases to be configured. The model may comprise a machine learning model. The method may comprise training the machine learning model and/or selecting parameters thereof using at least some of the user actions and/or the attributes.

The user actions may comprise an action taken by a user using the content selection interface that relates to one or more items of content of a use case.

The processor system may be configured to select, score, rate or rank use cases depending on if, or to what extent, each use case meets one or more target criteria. At least one of the criteria may comprise one or more of: how many of the user actions represented in the historical data are associated with a use case having a parameter value in common or otherwise associated with the respective use case; how long users interacted with a use case or content associated with a use case; how many advertising slots associated with a use case or the content thereof were interacted with; and/or the like. The processor system may be configured to provide a recommendation of one or more highest scoring, rated or ranked use cases from amongst a plurality of use cases to a user of a UX engine for configuring content selection interfaces. The processor system may be configured to automatically select one or more highest scoring, rated or ranked use cases from amongst a plurality of use cases for use in a content selection interface. The processor system may be configured to automatically set parameters of a use case based at least in part on the parameters of one or more of the highest scored, rated or ranked use cases. The processor system may be configured to use a machine learning model to determine one or more best performing use cases from the user actions represented in the historical data and/or the attributes thereof.

The processor system may be configured to identify data from the historical data for a first time period and data from the historical data for a second time period, wherein the first time period precedes the second time period. The configuring of the use cases may comprise using the use cases identified to be associated with at least some of the user actions of the first time period to configure use cases or a content recommendation engine for providing indications of available content on the content selection interface. The processor system may be configured to use at least some of the user actions of the second time period to asses performance of the configured use cases.

The providing of the historical data may comprise performing a wind-back or time-travel that comprises using only user action data, parameters and content recommendation models available during or at the end of the first time period. The database may be a relational database, with at least one of: user action data, parameters and/or content recommendation models provided for a plurality of dates and/or times. The user action data may be date and/or time stamped and the method comprises performing a wind-back to only use user action data, parameters and content recommendation models dated and/or time stamped for a date and/or time during the first time period.

The content selection interface may be a carousel based interface comprising a plurality of carousels and each carousel comprises a plurality of indications of selectable content selected using a different one of the configured use cases. The content selection interface may be such that selecting an indication of content, e.g. using a user input device such as a touch screen or pointer, may provide the content.

According to a third example of the present disclosure is a non-transitory computer-readable medium that comprises computer-readable instructions that are executable by a processor system to evaluate use cases for a content selection interface that provides user selectable indications of content available from a content provider according to the use cases, the indications of available content being selectable by a user to have the content provided to the user by the content provider, by at least:

accessing, from at least one computer readable data store, historical data representing previous user actions of a plurality of users using a content selection interface;
accessing, from at least one computer readable data store, use case data defining a plurality of use cases;
identifying, using the computing system, use cases from the plurality of use cases associated with at least some of the user actions; and
using the use cases identified to be associated with at least some of the user actions to configure use cases for providing indications of available content on the content selection interface.

The computer-readable instructions that are executable to cause the processor system to perform the method of the first example.

The individual features and/or combinations of features defined above in accordance with any aspect of the present invention or below in relation to any specific embodiment of the invention may be utilised, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

Various examples of the present disclosure will now be described by way of example, and with reference to the accompanying drawings, of which.

DETAILED DESCRIPTION OF THE DRAWINGS

Figure 1:
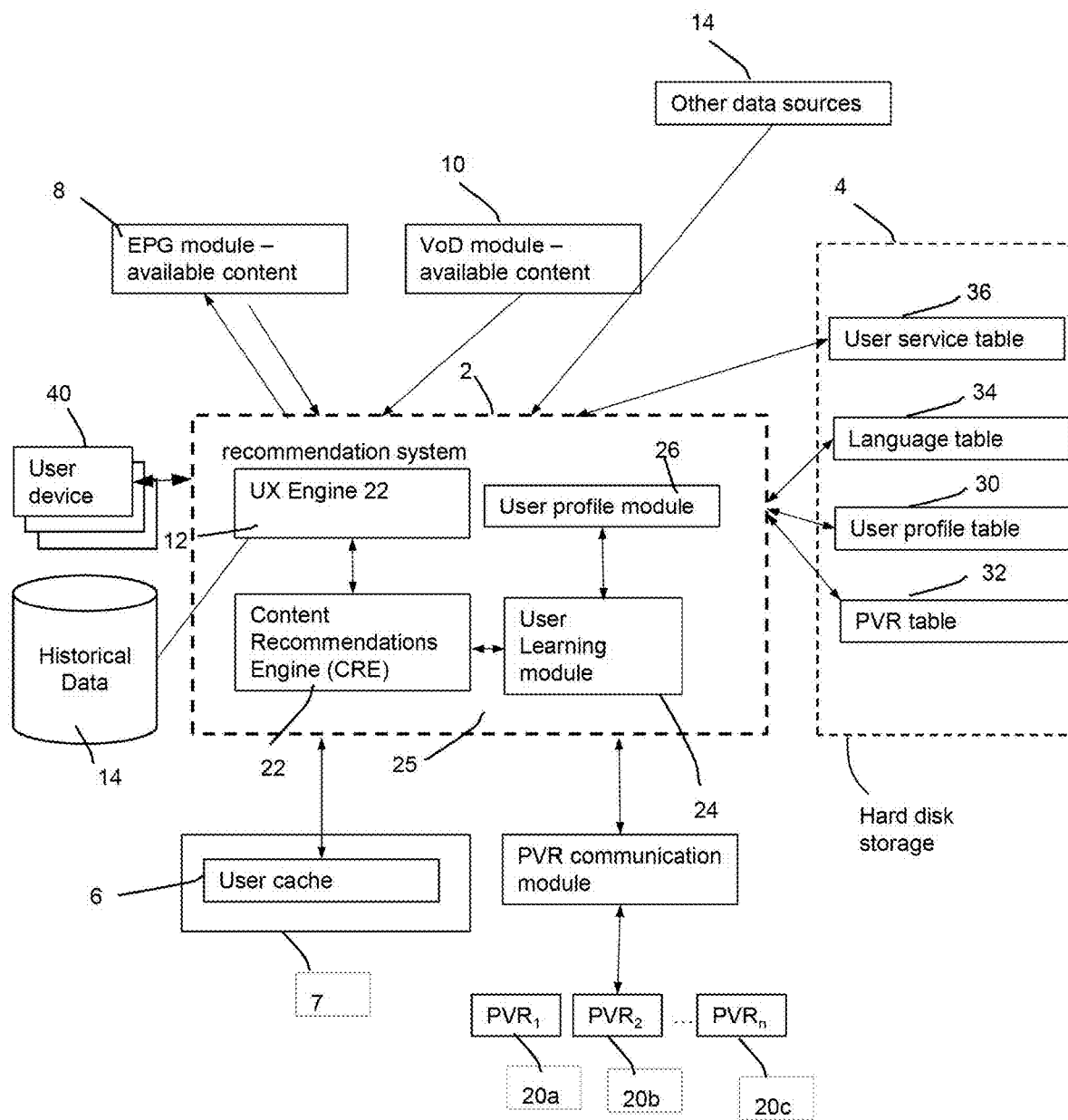
FIG. 1 is a schematic diagram of a computer system configured to provide services to a provider of a user content selection interface.

In TV systems, or other systems for provision of content to a user, each service provider may have thousands, tens or hundreds of thousands, or millions of customers, wherein each customer is unique and may have different viewing habits and preferences. In order to accommodate the range of tastes and interests of such a large customer base, and to keep those customer's interest, the service provider will often provide an extensive range of different content. However, the sheer volume of content available from service provider systems can present difficulties in navigating, identifying and retrieving content that the user would like to access and view. The content available to a user can be stored in a content database of a service provider, but if a user cannot readily navigate the content database to identify content of interest, then the user may get frustrated or may not fully realize the beneficial content available to them. As such, systems for allowing users to better navigate and select the content available from a content provider would be beneficial.

Content selection interfaces, such as but not limited to electronic program guides (EPGs), are provided for users to navigate the content available from one or more service providers. Such content selection interfaces can come in a range of forms, but one example of a content selection interface is a carousel based interface in which a number of carrousels are provided in the interface, each carrousel containing selectable indications of each item of content of a group of content that is selected according to a corresponding use case. The indications of the items of content are selectable by a user to access the selected content, e.g. to download, stream and/or view the selected content. For example, the user can select the indication of content of interest using a touch screen, a pointer or other suitable input device. Each group of content represented by the carousel may contain content linked by a theme or be otherwise grouped according to a use case that specifies the rules or algorithm that govern what content can be provided for that use case (and is provided in an associated carousel). A user can scroll through the different carousels, for example by scrolling up and down through the carousels. The user can also scroll through the content in any given carousel, such as but not limited to scrolling horizontally through the different items of content in a given carousel, until they find the content that they want. It will be appreciated that the disclosure is not limited to this specific carousel arrangement. For example, the user may be able to scroll through the groups of content in one direction and scroll through the indications of content in a given group in a different direction, which may or may not be horizontal and vertical. In another example, the groups of content can be hierarchical, where a user can drill down through collections of groups of content to select a specific group of content and then select the desired item of content in that group. However, other interface arrangements are possible.

Content selection interfaces such as this have been found to be particularly helpful to viewers. However, there are technical challenges posed by the sheer volume of content available and the limitations on on-screen area of many user devices for presenting the content selection interface. Furthermore, being able to access and use the content selection interface with as little lag as possible, may make overly large, complex or inefficient processes for providing the content selection interface undesirable. As such, improvements in content selection interface in order to enhance the ability of a user to search for content stored by, and available from, a service provider's computer systems may be beneficial.

Content recommendation systems can play a significant role in improving the efficacy of content selection user interfaces. In this case, content recommendation systems can identify content that is likely to be of interest to the user and the content selection user interface can be configured to ensure that the content likely to be of interest is provided in preference or ahead of content less likely to be of interest. As a result, users may be able to more quickly identify and select the content they are interested in with less user input. This can help reduce user frustration and increase user engagement.

However, tracking, recording and processing large volumes of customer data together with large amounts of content data within reasonable time constraints and with acceptable accuracy poses a significant technical challenge. The time constraints demanded by particular content providers, or expected by users, may be particularly demanding This can present a significant technical challenge, particularly as the system is usually hosted on one or more servers remote from the set top box or other device and, for systems with millions of subscribers, may have to deal simultaneously with millions of user actions or interactions per minute during busy periods.

Content selection interfaces and the use cases that govern the groups of content displayed therein, e.g. in carousels, can be configured using UX engines. Such UX engines allow operatives to create use cases that govern the content that can be selected for groups of content displayed on respective carousels of the content selection interface. However, significant amounts of time can be wasted creating use cases that govern the groups of content only to find that those groups of content are not well received or used by users. Content recommendation models are available that can recommend content that is likely to be of interest to viewers. However, such content recommendation models are often complex and often have a number of parameters that need to be set, wherein different values for the parameters can have a significant effect on the quality of the output of the content recommendation model. Making the UX engine more efficient and/or more effective would be beneficial.

Figure 2:
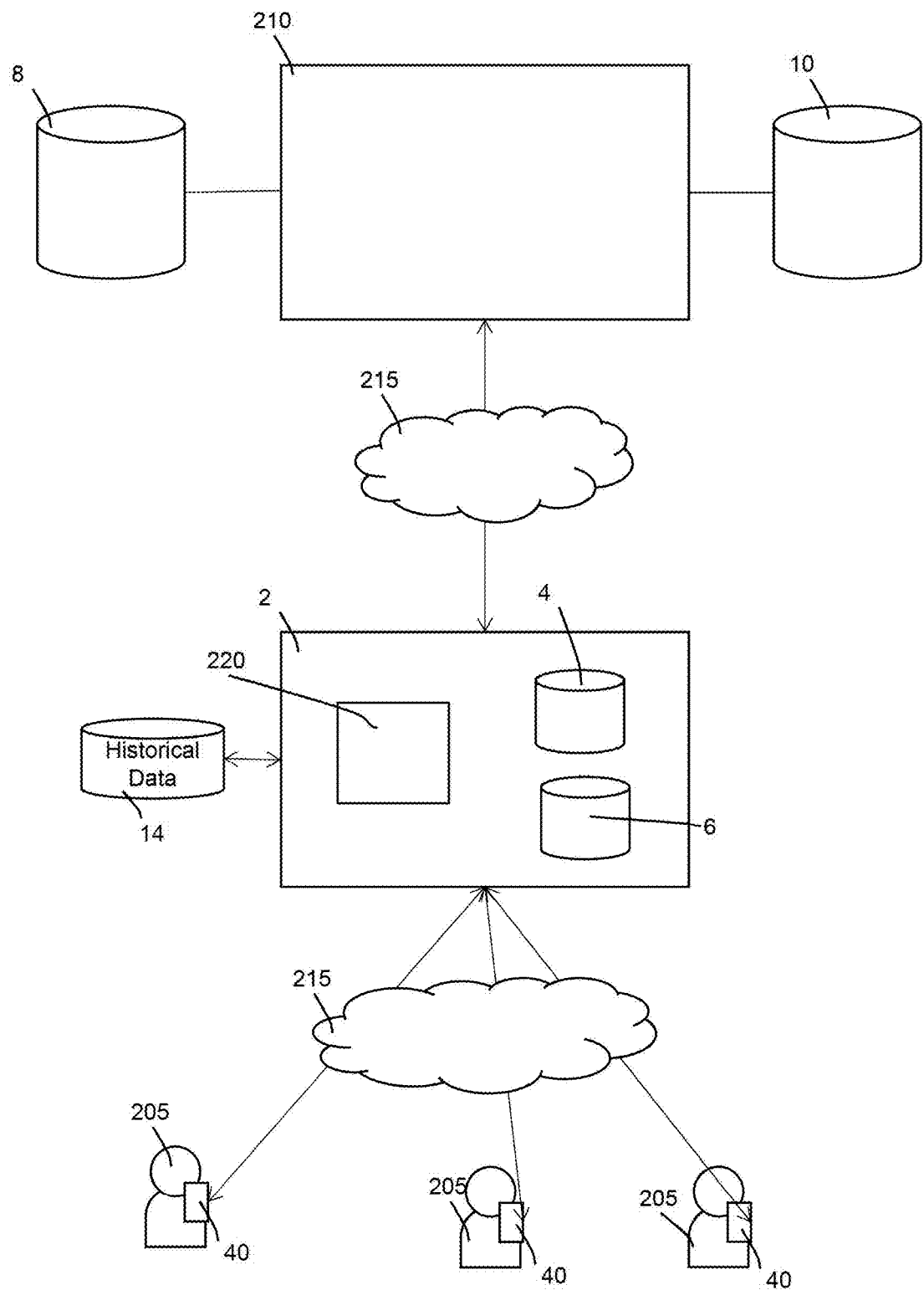
FIG. 2 is a simplified schematic of the system of FIG. 1.
Figure 3:
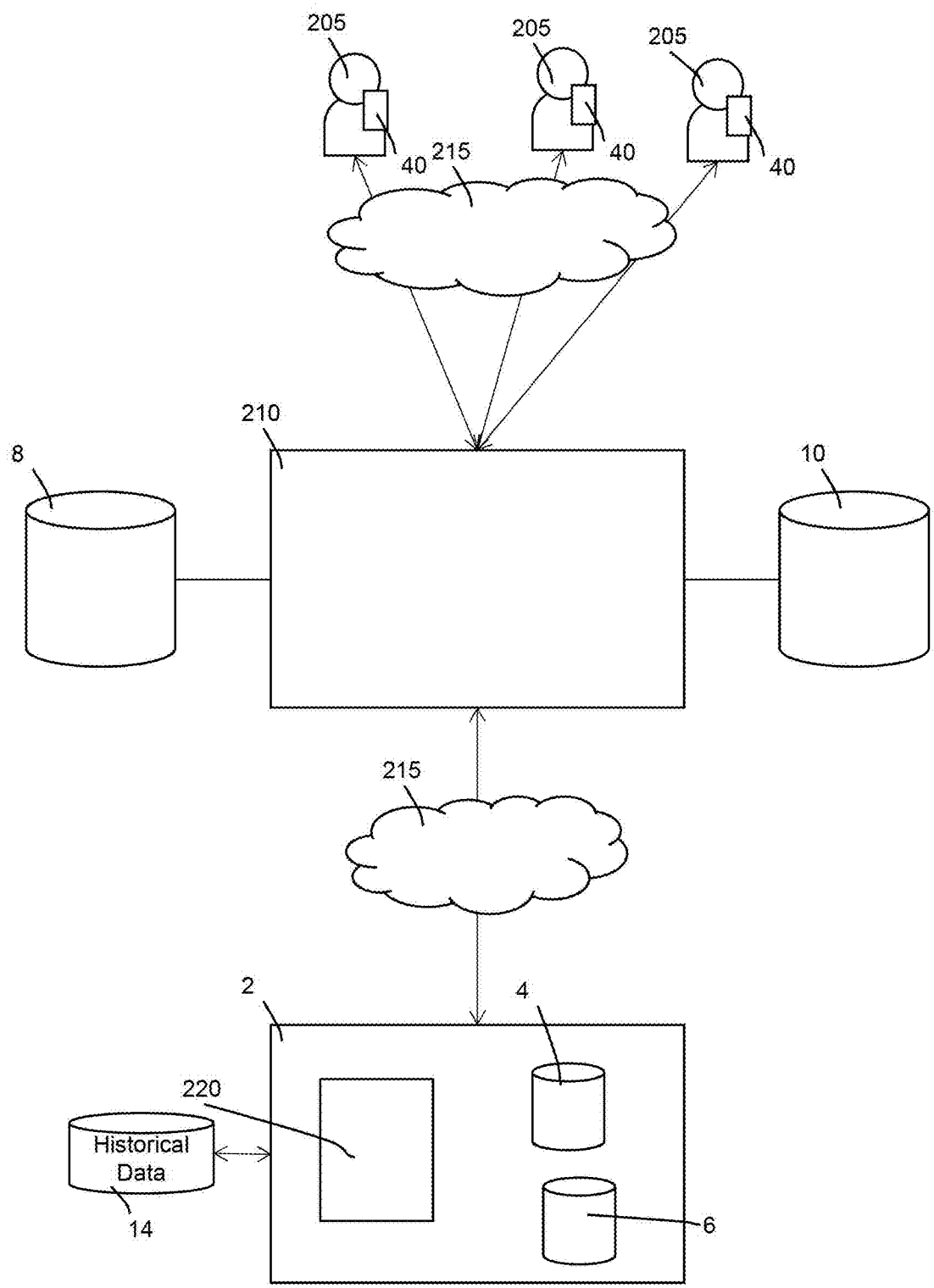
FIG. 3 is a simplified schematic of an alternative system arrangement to that of FIG. 2.

FIG. 1 shows a schematic diagram of a system 1 that comprises a UX engine 12 for configuring the use cases that govern the selection of content for groups of content that are displayed in user content selection interfaces that allow users 205 (see FIGS. 2 and 3) to navigate and select content available from a content service provider (210, also shown in FIGS. 2 and 3). In particular, the UX engine 12 can be used to configure the use cases that set out rules and/or algorithms for controlling which content is provided to the user in each section of content selection interfaces. In some examples, respective use cases are used to determine content that is provided for selection in respective carousels of a carousel type user selection interface. Beneficially, before use cases are deployed into the content selection interfaces, the use cases can be can be configured to refine or otherwise select parameters of the use case to provide more relevant content. This can, in some examples, involve guiding operatives in refining or selecting parameters of the use cases. In other examples, the UX engine 12 is configured to automatically refine or select parameters of the use cases. This may be particularly useful in creating new content selection interfaces, and also for refining use cases for existing content provider systems. In other beneficial examples, the historical user activity data can be used to automate the setting of parameters of use cases.

In the example of FIG. 1, the UX engine 12 is provided as part of a more general recommendation system 2 that comprises a content recommendation engine (CRE) 22 that can apply a set of processes to determine, in real time, content recommendations for a user based on user data and available content.

The content recommendation engine (CRE) 22 in this example is provided as part of an affinity profile generation system, which is operable to generate affinity profiles for users based on first party data. The first party data could be in the form of, for example, user actions performed in relation to the selection, viewing and other actions in relation to TV content provided by a TV distribution system, and/or in relation to other content. The recommendation system 2 in the embodiment of FIG. 1 is also able to provide content recommendations to users as well as generating affinity profiles. Content recommendations may be provided in real time or near real time for tens of thousands, hundreds of thousands, or even millions of users.

The UX engine 12 is operable by operatives, such as but not limited to operatives of a content provider, to define groups of content for presenting on the content selection interfaces of users 205 (see FIGS. 2 and 3) by configuring the use cases that govern what content can be selected for a given carousel (or other group of content). Advantageously, the UX engine can guide or automate the configuration of use cases using historical user activity data from a range of users across the content provider's user base to identify use cases and values of parameters of use cases that are effective.

The historical user actions are collected by the recommendation system 2 and stored in data storage 14 for the historical data. These user actions could include previous interactions users 205 have had with the user content selection interface that the system 1 is currently looking to configure and/or with other user content selection interfaces. Beneficially, such user interactions may comprise first party data in the form of, for example, user actions performed in relation to their selection, viewing and other actions in relation to content provided by the content provider such as but not limited to TV content provided by a TV distribution system or other types of content.

Some example modes of operation are described below in relation to PVRs associated with users, but content may be provided or accessible via any suitable devices, for example set-top boxes, smartphones, PCs or tablets or any other suitable content delivery mechanism.

As noted above, the system 1 in the embodiment of FIG. 1 comprises the recommendation system 2 that includes the content recommendation engine (CRE) 22, the UX engine 12 and a user profile module 26, each of which is linked to a first storage resource in the form of a hard disk storage device 4, which is used to store various user data, including user actions. The recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

As discussed further below, recommendation system 2 is able to communicate, either directly or indirectly, and either via wired or wireless connection, with very large numbers of user devices 40 of users 205 and to provide recommendations for or derived from such users and their user devices 40. Other than some PVRs, which are shown schematically in FIG. 1, only a few user devices 40 are shown in FIG. 1 for clarity, but it will be appreciated that more or less user devices 40 could be present. The user devices 40 could include, as examples only, a user's mobile phone, smart TV, tablet computer, laptop, smart watch or other suitable viewing device.

The recommendation system 2, and specifically the CRE 22, the UX engine 12 and the user profile module 26 are also linked to sources of information concerning available content, in this case an EPG module 8 and a Video-on-Demand (VOD) module 10 which provide information about content available to a user 205 from a service provider system 210 (see FIGS. 2 and 3) via an EPG (for example, scheduled TV programs on a set of channels) and via a VoD service. In alternative embodiments, a variety of other sources of content may be available as well as, or in addition to, EPG and VoD content, for example internet content and/or any suitable streamed content via wired or wireless connection. The EPG is provided as an example of a content selection interface that allows users 205 to look for content available from the service provider and to select content, e.g. for download, streaming and/or viewing. However, the present disclosure is not limited to EPGs and could also be applied to other content selection interfaces, e.g. for music provision services, audio book services, film streaming services, image provision services, video game provision systems, creator content, book or article selection interfaces, amongst others. The content may comprise video, audio, text, images, video games, or other data.

In the embodiment of FIG. 1, the EPG module 8, the UX engine 12, the user profile module 26, the VoD module 10, the CRE 22, the user cache 6, the PVR communication module 12, and a user learning module 24 are implemented in a server. The server includes communication circuitry that enables communication between the server, or appropriate components of the server, with each of the user devices 40, and with the content sources, for example a TV service operator or other content service operator. However, other arrangements are possible, e.g. one or more of the above components may be distributed over other systems or more generally in the cloud.

Any other suitable implementation of the EPG module 8, the VoD module 10, the UX engine 12, the user profile module 26, the content recommendation engine (CRE) 22, the user cache 6, the PVR communication module 12, and the user learning module 24 may be provided in alternative embodiments, for example they may be implemented in any software, hardware or any suitable combination of software and hardware. Furthermore, in alternative embodiments any one of the components described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television program metadata. The metadata may be representative of a variety of different content parameters or properties, for example but not limited to program title, time, duration, content type, program categorization, actor names, genre, release date, episode number, series number. It is a feature of the embodiment that the metadata stored at the EPG module 8 and the VoD module 10 may also be enriched with additional metadata, for example by the operator of the system, such that additional metadata to that provided by the content sources or other external sources may be stored.

In the embodiment of FIG. 1, the system 1 operates together with three sources of content for a user device 40: real-time linear television, for example terrestrial or satellite broadcast television; one or more video-on-demand (VOD) services, and pre-recorded video content stored on one or more personal video recorders (PVR). In alternative embodiments further sources of content as well as or instead of those shown may be used.

The operation of the system 1 is controlled by the recommendation system 2. As can be seen in FIG. 1, the recommendation system 2 is configured to communicate with the one or more content information modules such as the electronic program guide (EPG) module and VoD module 10. The recommendation system 2 is also configured to communicate with the user cache 6 local to the recommendation system 2, the hard disk storage resource 4 and the one or more PVRs. A data access layer provides a communication interface between the recommendation system 2 and the hard disk storage resource 4. A personal video recorder (PVR) communication module 12 provides a communication interface between the one or more PVRs 20*a*, 20*b*, . . . 20*z* and the affinity profile and recommendation system 2.

As discussed in more detail below, the user profile module 26 is operable to use first party data collected by an operator of the system to determine user activity profiles of users 205, which are representative of user actions of a user 205 during operation of content selection interfaces.

The content recommendation engine (CRE) 22 can apply a set of processes to determine, in real time, content recommendations for a user 205 based on the user data (e.g. user actions) and available content.

The user learning module 24 receives data indicative of selections or other actions by a user 205 and builds up a set of user data, for example comprising or representing a user history or profile, which is stored in the hard disk storage 4, and which can be used in generating personalized recommendations for the user 205.

The UX engine 12 allows for configuration of use cases that govern the content that can be included in groups of content that are displayed in content selection interfaces. The use cases comprise an algorithm or set of rules having a plurality of parameters that define the content that can be selected for that use case. The use case does not in itself select the content, but instead governs what content can be selected, e.g. by the CRE 22 or by manual selection. Typically, each use case populates a different section (e.g. carousel) of the content selection interface. The UX engine 12 allows use cases to be configured by selecting use cases and setting the values of the parameters of the use cases. For example, a use case could be a "because you watched . . . " use case and the parameters may include parameters such as a time since you watched a pervious content that the recommendation is valid for, a duration to be watched before a recommendation is valid and so on. Another use case could be a genre based use case and the parameters could comprise, for example, genre type (e.g. comedy, romance, action, sci-fi, etc.), language (e.g. English, Spanish, Mandarin, etc.), content type (e.g. linear/TV, VoD, etc.), device type (e.g. mobile device, 4 k screen, etc.), number of content items to include, amongst other examples. However, other use case types could be used and the disclosure is not limited to these specific examples.

The use cases and the parameters of the use cases could be selected at least in part responsive to input from an operative, such as an operative of a content provider service, and/or at least in part automatically, or any combination thereof. The UX engine 12 allows the use cases to be created and/or configured. The UX engine 12 provides a UX engine interface (see FIGS. 8 and 9) that allows operatives (such as operatives of the content provider or a third party service provider) to select use cases, configure the use cases by viewing and inputting values for parameters of the use cases and to receive guidance on and/or to auto-select values of the parameters of the use cases that are likely to be desirable to the users of the content provider.

Once configured with suitable user action data, the content recommendation engine (CRE) 22 can recommend content for any given user using the use cases to control what content is selected. Importantly, use cases can be applicable to many users, e.g. the rules by which content is selected for any given use case can be applicable across many users. However, the content selected for a use case can vary between users (as content is selected by the CRE 22 at least in part depending on individual user profiles generated by user profile module 26 and stored in user profile table 30, which in turn depends on past user actions and preferences). The configuring of the use cases that control how the content is selected for a given group of content in a content selection interface is different to the selection of content that populates the content selection interface for any given use case.

In an example, each use case corresponds to a different display area of a content selection interface, such as a different carousel in a carousel type user interface, but the present disclosure is not limited to this. In some examples, at least one or each use case may represent a different theme, such as war movies, romances, action movies, nature programs, news and current affairs, and the like. However, this need not be the case, and at least one or each use case could be simply selected by the operative or another party.

In examples, historical user action data is used by the UX engine 12 to automatically configure use cases and their parameters. In other examples, the UX engine 12 uses historical user action data to provide recommendations of use cases and their parameter values to an operative for manual selection.

The configuration of the use cases (and content recommendations in examples in which the UX engine 12 is part of a recommendation system 2) can be based on user actions, wherein at least some of those user actions include user interaction with content recommendation user interfaces. FIG. 1 shows user actions being communicated directly to the recommendation system 2 from the user devices 40. The recommendation system 2 is configured to log user activity, i.e. user actions. By logging user activity, i.e. user actions, and storing the user activity over an extended period of time, the recommendation system 2 and the hard disk storage 4 can build up an overall picture of the user actions of a plurality of users relating to their interactions with content selection interfaces. User actions are turned into learn actions by the user learning module 24 to be processed by the user profile module 26, the UX engine 12 and the content recommendation engine 22.

The system of FIGS. 1 to 3 is configured to operate with a plurality of user devices each associated with at least one user 205 (e.g. belonging to the user 205 or into which the user 205 is logged in). The plurality of user devices 40 may comprise a large number of devices 40, for example thousands, tens or hundreds of thousands, or even millions of devices 40. Each user device 40 may be any device or combination of devices that is configured to enable a user to view or otherwise consume content. For example, each user device 40 may be an internet-enabled device and/or a device for providing video or other content on demand and/or a device capable of receiving a real-time linear television broadcast signal. The user device 40 may be a mobile device, for example a tablet, a smart phone or a laptop. Alternatively, the user device 40 may not be mobile, for example, an internet browser enabled computing device, a smart television or a set-top box. The user device 40 may also have an in-built or associated PVR for recording and storing content in some embodiments.

The user 205 may be a viewer of the user device 40. Alternatively or additionally, the user 205 may be a subscriber and/or customer of a service accessible through the user device 40.

The user cache 6 is coupled to the user profile module 26, the UX engine 12 and the content recommendations engine (CRE) 22, and data stored by the user cache 6 may be used by the user profile module 26, the UX engine 12 and the content recommendations engine 22. The recommendation system 2 can access data stored on the user cache 6. The user cache may be provided in random access memory (RAM) 7.

The hard disk storage 4 is communicatively coupled to the recommendation system 2. The hard disk storage 4 stores data for use by the recommendation system 2, including user actions, also referred to as user activity. The hard disk storage 4 is configured to store one or more databases. Entries from the databases on the hard disk storage resource 4 can be retrieved by requests made through a data access layer. Entries in the databases may also be updated via the data access layer.

The database(s) at the hard disk storage 4 store user data that is used by the user profile module 26 to generate and update user profiles for users 205. That data can be used by the content recommendation engine (CRE) 22 to generate recommendations for configuring the content selection interface for the specific user 205 and/or can be used by the UX engine 12 to configure use cases that define groups of content for presentation on the content selection interface. For example the data store 14 that stores historical user action data can be a part of the data store 4 or could be a separate data store. In the embodiment of FIG. 1 a set of database tables is provided that store information concerning the users 205.

In the embodiment of FIG. 1, the tables may include at least one user service table that represents user service requirements, and at least one user profile table 30 that includes user attribute data that may be included in a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user, the gender of the user and/or the like.

In the embodiment of FIG. 1, the tables may include various user learning tables that include data representing user 205 actions, also referred to as user activity, relating to content selection interfaces. Examples of user 205 actions that constitute user activity that can be collected include one or more or each of: selecting content associated with one or more use cases; scrolling through content associated with one or more use cases; hovering a cursor for greater than a threshold period over content associated with one or more use cases; pausing scrolling for greater than a threshold period through content associated with one or more use cases displayed on a user interface; downloading content that is associated with one or more use cases; having watched at least part of content that is associated with one or more use cases; bookmarking content that is associated with one or more use cases; browsing content that is associated with one or more use cases; recording content that is associated with one or more use cases; adding content that is associated with one or more use cases to virtual shopping basket or otherwise selecting for purchase or potential purchase; watching or listening to a trailer for content that is associated with one or more use cases; playing content that is associated with one or more use cases on a user device; purchasing content that is associated with one or more use cases; clicking on or otherwise selecting content that is associated with one or more use cases from a list of search results; remotely recording content that is associated with one or more use cases; setting a reminder for content that is associated with one or more use cases; liking, making a favorite or otherwise adding to a list content that is associated with one or more use cases; disliking content that is associated with one or more use cases; messaging about content that is associated with one or more use cases; posting on social media about content that is associated with one or more use cases; playing purchased content that is associated with one or more use cases; stopping watching or playing content that is associated with one or more use cases; and/or rating content that is associated with one or more use cases, from amongst others.

For example, if a user 205 selects a program or other item of content from a content selection interface and views or otherwise consumes it for greater than a threshold period of time then a learn action is generated and at least one user data item for that user is stored in at least one of the tables. The data item may include various data including for example start and stop viewing time, time slot identifier, program identifier, which group of content the content belongs, at least some metadata concerning the program (although such metadata may be stored separately as content data rather than user data in some embodiments, and linked to or otherwise accessed if required, for example by the program name or other identifier). The user learning module 24 determines whether user data should be stored in the tables in respect of a particular user action or set of actions. For example, if a user only views a program for a very short period of time, for instance if they are channel surfing, then user data is optionally not stored in the user learning tables in respect of that action. User data can be stored in respect of a variety of different user actions or events, for example selecting, viewing, recording or searching for content or any of those listed above or others that would be apparent to a skilled person.

In the embodiment of FIG. 1 a large part of the user data comprises user history or user action data that represent user actions over a significant period of time. In various embodiments, there is a limit to how long user data is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial. Furthermore, the user data comprises history or user action data relating to many users, e.g. at least a significant portion, most or all of the users of a content provider.

Although a particular system arrangement is shown in FIG. 1, there are various system arrangements that could be used.

FIG. 2 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user during operation of the content selection interface, including one or more of the user actions listed above.

The user devices 40 also provide a user ID that can be used to identify the user 205 to allow the CRE 22 to select content that is customized for that user 205. The user devices 40 communicate the data over a network, such as the cloud 215, to the recommendation system 2. The recommendation system 2 records the user actions in order to generate learn actions. These can be used to build and update a user profile that can be used select content customized for the user 205. The recommendation system 2 can communicate the requests and other data from the user devices 40 to the content providers systems 210 in order to provide the content to the user devices 40. Importantly, the user actions for most or all of the users of the content provision system can be stored for at least a period of time as historical user data that is used by the UX engine 12 to identify use cases that are likely to result in content that will meet one or more targets of the content service provider, e.g. most views, longest viewing duration, and/or the like.

Other system arrangements that provide the UX engine 12 that utilizes historical user actions by a range of users for improving the configuration of the use cases are possible. FIG. 3 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and to configure the use cases. The recommendation system 2 provides the data for configuring the use cases that control the content selected for users by the CRE 22 to present at least some of the groups of content in the user selection interface, to the systems of a content provider 210 for providing in the content selection interface for that user 205.

Figure 4:
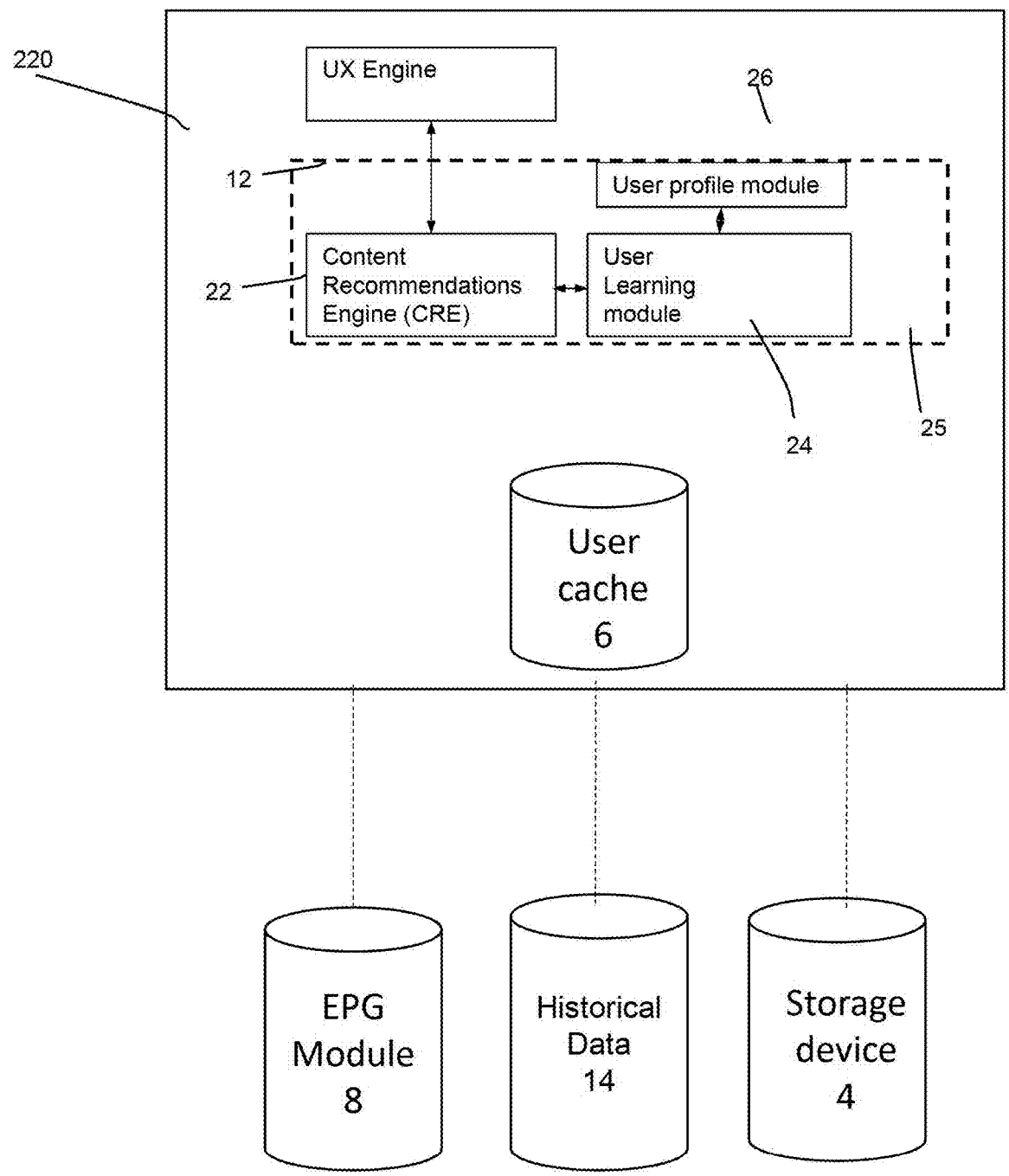
FIG. 4 is a schematic of a processor system of a recommendation system that provides a UX engine for configuring a content selection interface.

FIG. 4 shows an arrangement of processing resource 220 for implementing the recommendation system 2, including the UX engine 12 and in some examples also the recommendation service 25 that includes the CRE 22, the user learning module 24 and the user profile module 26. The processing resource can optionally comprise one or more processors, FPGAs, ASICS or the like, which may be provided in a single machine or distributed over a plurality of machines, and may be locally arranged or remote from each other and connected over a network in a distributed computing arrangement. The processing resource 220 is configured to communicate with content databases, such as the EPG module 8, to retrieve content available from the content provider. The processing resource 220 comprises rapid access storage, such as user cache 6, which may be implemented in RAM or SSD storage to provide fast access to user profiles and actions that the processing resource is currently, and will next be, performing operations on. The processing resource is also configured to communicate with data storage such as storage device 14 that stores historical user actions from most or all of the users of the content provider, which can be retrieved into the use cache 6 when needed by the processing resource 220. The UX engine 12 can be accessed by the operatives of the content provider (or other suitable users) to configure the use cases that control what content is selected by the CRE 22 for display on user content selection interfaces provided to user devices 40 for navigating and accessing the content available from the content provider. As part of this, the UX engine 12 can provide a UX engine interface 605 (see FIGS. 7 and 8) and the mechanism that underlies it (see FIGS. 9 and 10), which uses the historical user actions from a plurality of the users in order to improve the configuration of the use cases, as will be described in more detail below.

Figure 5:
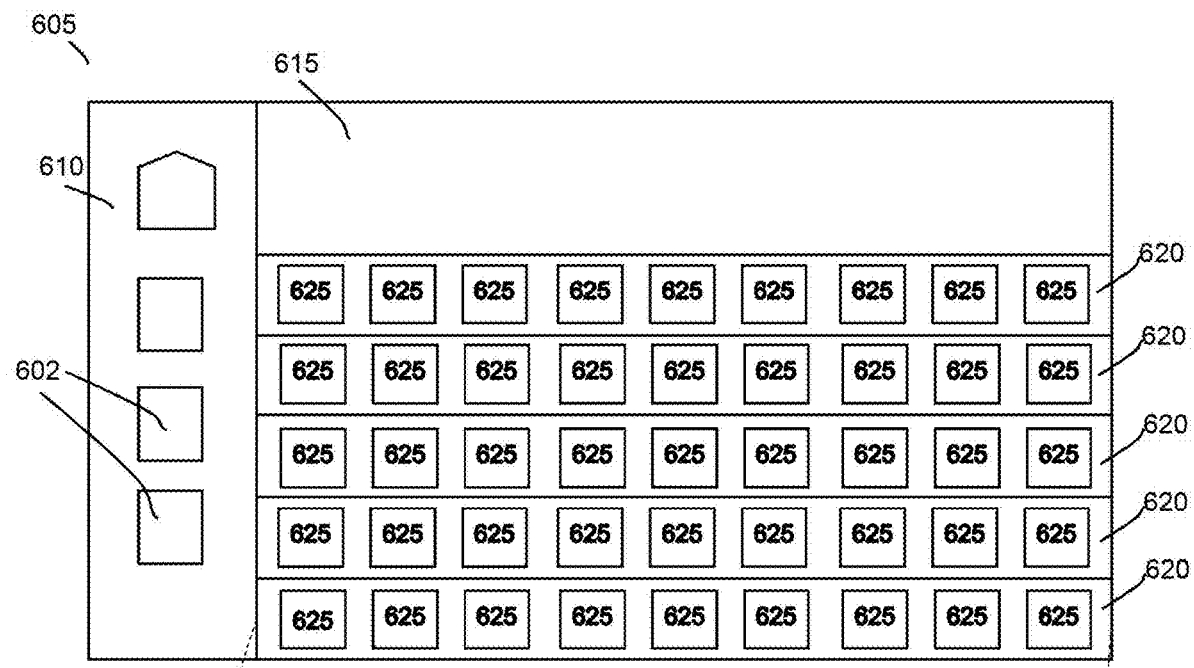
FIG. 5 is a schematic of a content selection interface.
Figure 6:
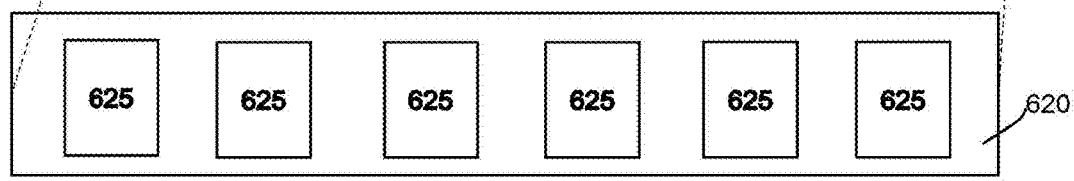
FIG. 6 is detail view of the content selection interface of FIG. 5.

FIGS. 5 and 6 show an example of a content selection interface 605. In this example, the content selection interface 605 optionally comprises a high level menu bar 610 down one side that can contain functions such as "home page", "search" and/or may show the high level folders 602 that are available for selection. Each high level folder 602 may comprise one or more use cases. In some examples, the high level menu bar 610 can be used to switch content provision services or users or switch high level folders, which may impact the use cases utilised by the content selection interface 605. That is, the groups of content 620 displayed and available for content selection will automatically update on selection of a service, user or high level folder 602 in the high level menu bar 610 to show groups of content associated with that service, user and/or high level folder 505.

The content selection interface 605 further comprises a headline banner 615 that is optionally always fixed at the top of the content selection interface 605 or at least is provided as the first selectable item in the content selection interface 605 at least until such time as an operative changes the headline banner 615.

Beneath the headline banner 615 is a plurality of carousels, each carousel containing a group of content 620 representative of, and configured by, a respective use case. In this example, each carousel comprises a plurality of selectable indications of items of content 625 that are comprised in the group of content 620 for that carousel. Each indication represents a different contain item 625 that is contained in the group of content 620 that is representative of, and configured by, a respective use case that is allocated to that carousel. Thus, in the content selection interface 605, each carousel corresponds to and shows a corresponding different group of content 620, and each content indication in the carousel represents and indicates a different item of content 625 from the group of content 620 that can be selected by the user 205 by selecting the corresponding content indication.

The user 205 can scroll up and down through the carousels. As the user scrolls down through the carousels 620, new carousels representing different groups of content 620 appear at the bottom with the top carousel simultaneously disappearing, and vice versa as the user scrolls up through the carousels 620. Each carousel contains an indication of the corresponding title of the use case used to generate the content for that carousel. When the user 205 identifies a carousel corresponding to a use case of interest, the user 205 can scroll from side to side along the carousel to scroll through the selectable indications of content 625 of the group of content 620 associated with that carousel 620.

Figure 7:
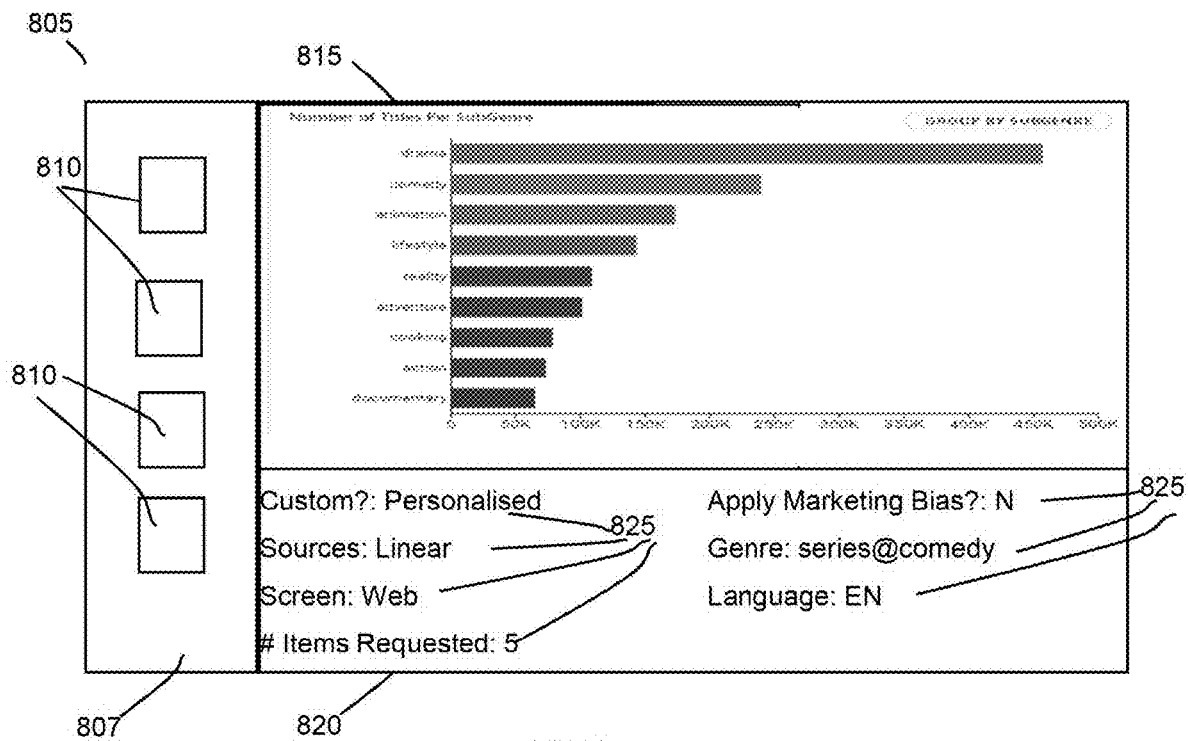
FIG. 7 is an example of a use case configuration interface of a UX Engine.

A detail view of a carousel representing a group of content 620 from the content selection interface 605 is shown in FIG. 7, which shows a plurality of selectable indications of content 625. The indication of content 625 could comprise, for example, a thumbnail showing an image of the item of content 625 and/or text indicating the name of the content or the like. When the user identifies the content 625 represented by the content indication that they want to consume, then the user 205 selects the desired indication of the content from that carousel 620 to request provision (e.g. download, streaming, viewing or the like) of the item of content 625 represented by that indication.

Of course, there are many arrangements of content selection interfaces and the present disclosure is not limited to the particular arrangement of content selection interface shown in FIGS. 6 and 7. For example, in alternative content selection interfaces, the user 205 can scroll through groups of content 620/carousels horizontally (or in any other direction) and scroll through the indications representing content items 625 vertically (or in another direction that is different from the direction through which the groups of content are scrolled through). Some content selection interfaces may be arranged in a hierarchical structure, with the user able to drill down through collections of groups of content 620, into groups of content 620 and finally down into content items 625. However, various other arrangements would be apparent to a person skilled in the art and to which the concepts of the present disclosure could be applied and the present disclosure is not limited to the content selection interface 605 shown in FIGS. 6 and 7.

In the present example, the use case controls what content can be selected for a group of content 620. The use cases comprise one or typically more parameters that have values that control what content can be selected for that use case. For example, a parameter of the use case could specify a certain genre, and the values of the parameter could be, for example, horror, comedy, action, sci-fi or romance etc., and all content selected for that use case would have to conform to that genre. The use case could additionally or alternatively contain a parameter that specifies one or more source types (for which the values of the parameter could be, for example, video on demand, linear/TV, PVR, or the like), and the content may be selected only from sources corresponding to the one or more stipulated sources. The use case could additionally or alternatively comprise a parameter that species one or more languages, and the content selected may only comprise content that is in one of the one or more stipulated languages. The above are not intended to be an exhaustive list of parameters of the use case and other parameters could be used such as screen type, delivery channel, processing resource, amongst others. Furthermore, the parameters could be in the form of rigid specifications that have to be met, or more flexible restraints, e.g. in the form of weights, biasing factors or ranges or the like that may apply a penalty to un-favored content and/or may apply an increment to favored content and/or the like. In some examples, the content that can be selected for a given use case could be selected by a machine learning model or equation and the parameters of the use case could comprise parameters of the machine-earning model or equation. In general, the parameters control the selection of content for that use case.

In examples, the use cases are the same for all users 205, but the content 625 selected for each user 205 according to the parameters of the use case could be different. That is, in some examples, the actual content 625 selected for a given user 205 and use case is a function of both the parameters of the use case and a user specific selection mechanism, such as a user profile based at least in part on part user actions recorded by the recommendation system 2. For example, the parameters of the use case may determine a subset of all available content that conforms to the parameters, and the CRE 22 may select or at least prioritize content 625 from the subset for provision to a given user 205 or group of users 205 based on the user profile. However, other mechanisms for applying the use case and selecting content could be used.

Each group of content 620 is a plurality of items of content 625 selected according to a common use case. In the example of FIGS. 5 and 6, each carousel of the content selection interface 605 contains a single group of content 620 associated with a single use case, and is labelled as such, e.g. with a title of the use case, which may be a genre, or "selected by <<selector's name>>", or "recently viewed", or "because you watched <<content title>>, you might like . . . ", or the like. The title may be a general descriptor of the use case or the intent of the use case, and could be provided by an operative in creating the use case or automatically applied, e.g. according to rules or a title selection model or the like.

The content items 625 in the groups of content 620 and/or the groups of content 620 themselves can by automatically created or can be manually picked by an operative or any combination thereof. For example, as noted above, the items of content 625 for a use case for a given user 205 or group of users 205 can be selected by the CRE 22 in accordance with the parameters of that use case and based on the user profile for that user 205 or group of users 205. In examples, guidance to operatives for selecting and/or configuring the use cases that control and govern the properties of the content 625 can be provided in the UX engine 12 based on historical user action data as will be detailed further below. Additionally or alternatively, the use cases can be configured and/or selected automatically based on historical user action data, or any combination of guided manual selection and automated selection and/or configuration of the use cases could be used.

Figure 8:
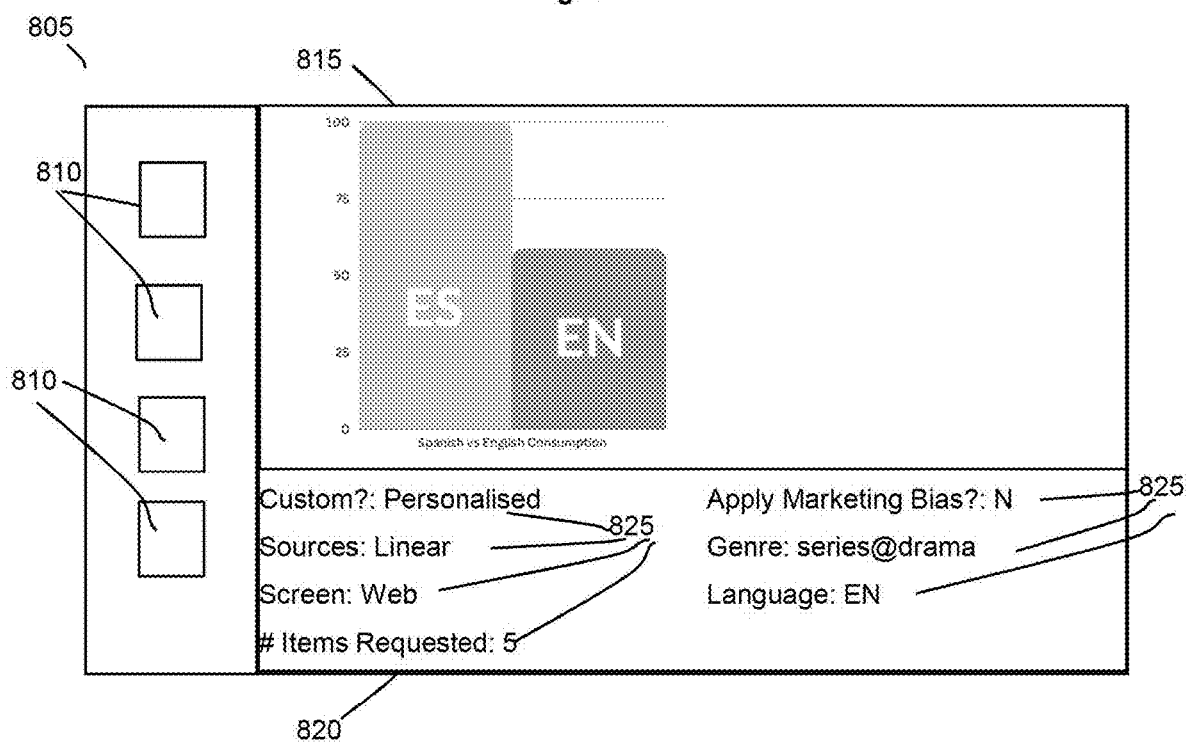
FIG. 8 is an example of an updated view of the interface of FIG. 7.

An example of a user interface 805 of the UX engine 12 is shown in FIGS. 7 and 8. The user interface 805 has a use case selection region 807 indicating a plurality of selectable use cases 810, a use case parameter guidance region 815 and a use case parameter region 820.

The use case selection region 807 contains one or more indications of available use cases 810 that have been previously created or are available as defaults for the operative of the UX engine 12. Each use case 810 is provided with a title that is representative of an intention or theme of the use case, e.g. "selected by . . . <<selector>>", "because you watched . . . , you might like . . . ", a genre indicator, a timescale based indicator such as "movies from the 80$s$" or "recently added", and/or the like. The title of each use case 810 is indicated in the use case selection region 807. The use case selection region 807 is configured to allow an operative to scroll through the existing use cases 810 and select a use case 810 to configure, and/or to create a new use case 810. The use cases 810 can be presented in any suitable format, e.g. as a scrollable column, in a hierarchy of folders and files, in a nested list or the like.

When a use case 810 is selected by an operative (e.g. using any suitable selection input device such as a touch screen, mouse, rollerball, track pad, e-pencil, pointer, or the like), then the parameters 825 of that use case available for configuration are displayed in the use case parameter region 820 and guidance to the operative for selecting parameters 825 and/or values of the parameters 825 for that use case is provided in the parameter guidance region 815.

The use case parameter region 820 comprises a list of the parameters 825 of the selected use case and the current values of the parameters 825. The parameters 825 are control parameters that control the selection of content for the selected use case 810. In the example shown, the selected use case 810 has seven parameters 825, namely "customization allowed?", "source type", "screen", "#items requested", "apply marketing bias?", "genre" and "language". Each of the parameters 825 has a value. For example, the parameter "customization allowed?" may have two possible values "personalized" indicating that content for that use case 810 can be personalized for each user 205 or group of users 205 or "set" which means that the content provided is the same for all users 205. The parameter "sources" may have a variety of values such as "linear (TV)", "on demand" and/or the like. The parameter "items requested" may have a value that is a numerical value corresponding to a number of content items to be provided for that use case 810 (at least up to a maximum value allowed). The parameter "genre" has a value that specifies a genre of content that can be provided for that use case 810, which could be, for example, sport, comedy, horror, superhero, comedy, drama, animation, lifestyle, reality, adventure, cooking, action, documentary, and/or the like. The "language" parameter could have a value corresponding to a language that content should be provided in, such as Spanish, English, French, German, and/or the like. Although some specific examples of parameters and parameter values have been given, the present disclosure is not limited to these and other parameters and parameter values would be apparent to a skilled person. If a new use case 810 is created, then either blank or default parameters 825 and values are displayed. The user interface 805 of the UX engine 12 is configured to allow the operative to add, remove and amend parameters 825 and values in the use case parameter region 820.

An operative could simply manually select the parameters 825 and the values thereof, e.g. based on their skill, knowledge, expertise, goals, targets, etc. However, the parameters and parameter values can have a significant effect on the effectiveness of a use case 810 in prioritizing display of content that users 205 of a content provider are most likely to want in the content selection interface 605. Significant content views or viewing time could be lost and users 205 may be less engaged or find it harder to identify and select content of interest to them if sub-optimal parameters 825 and parameter values are deployed. The UX engine is configured to provide guidance to operatives based on historic user actions of the user base of the content provider in the use case parameter guidance region 815. In examples, the use case parameter guidance region 815 is configured to provide guidance for a parameter that the operative has selected in the use case parameter selection region 820 and/or cross correlations between multiple parameters 820.

In the example of FIG. 7, the operative has selected the "genre" parameter 825 from the use case parameter region 825 and the UX engine 12 is configured to automatically display a representation (in this example a bar chart) of a performance score for each genre (i.e. for each value of the genre parameter 825), or a subset of the highest scoring genres. The performance score could be a simple score that is representative of a given target metric, such as number of times content of that genre has been selected by a user in the historical data, a duration that content was watched for by a user in the historical data, or the like. In examples, the performance score may be a combination of metrics, e.g. a weighted combination or a function of a plurality of metrics or the like. In examples, the metrics may otherwise take into account the other parameters, e.g. how many times was content selected for that genre from a group of content 620 generated according to a use case having one or more or all of the other parameters and/or parameter values the same as those currently selected for the present use case.

In the specific example of FIG. 7, the top nine genre's from the historical user actions for number of content selections from carousels whose content 625 was generated by a use case for that genre is shown as a bar chart. From this, it can be seen that "drama" was by far the most popular genre for users 205 of the content provider, ahead of comedy. As such, although "series@comedy" is currently selected as the value of the "genre" parameter 825, the operative may choose to select "series@drama" as the value of the "genre" parameter 825 based on the guidance provided in the use case parameter guidance region 815.

FIG. 8 shows the value of the "genre" parameter 825 as "series@drama". The operative may next select the parameter 825 "language". The current value of the parameter "language" is "EN" (English). Upon selection of the parameter 825 "language", the UX engine is configured to provide guidance for selection of the value of the "language" parameter in the use case parameter guidance region 815. In this example, the guidance is in the form of a bar chart indicating a relative consumption of content from the historical user action data by users of that content provider for the currently selected "English" value for language relative to the top performing language from the user action data of "Spanish". In some examples, the guidance presented may take into account the other parameters other than that currently selected. For example, the guidance may be for consumption of content from the historical user action data when selecting from carousels with groups of content 620 for use cases that have one or more or each other parameter 825 and/or values for parameters 825 that are currently selected for the use case presently being configured. Based on the guidance presented in the use case parameter guidance region 815, the operative may decide to change the value of the "language" parameter to "Spanish".

In the examples, the guidance provided in the use case parameter guidance region is based on historical user action data across the user base of the content provider (or providers) whose content will be accessed by that content selection interface 605 for which the use cases 810 are being configured.

An example in which the historical user actions are used to provide guidance on parameter values to an operative using the user interface 805 of the UX engine 12 is shown in FIGS. 7 and 8. This is beneficial in that it still allows an operative to check and make the decision on implementing the suggested parameter values provided in the use case parameter guidance region 815. However, the disclosure is not limited to this and other arrangements can be used additionally or alternatively to that described above. For example, although the use case parameter guidance region 815 in the examples of FIGS. 7 and 8 displays values for a selected parameter 825, this need not be the case. For example, the use case parameter guidance region 815 could additionally or alternatively display guidance for cross correlations, combinations or functions of multiple parameters 825. As another example, the use case parameter guidance region 815 could display scores for different parameter 825 types and provide functionality for selection of parameters 825 to use for the use case 810. For example, the use case parameter guidance region 815 could show which parameters 825 have the greatest influence on user actions or lead to the most favorable user actions or other criteria from the historical user action data. As such, the UX engine 12 and the associated user interface 805 are not limited to the above example, and other arrangements of these could be used.

In one such example, the selection of one or both of: the parameters 825 and/or the values of the parameters 825 can be automated.

In examples, some of the historical user action data could be held back and used to determine the relative performance of different combinations of parameters 825 and/or parameter values. In examples, the historical user action data can be divided by date into user action data for a first period that precedes the user action data for a second period. The user action data for the first period can be used to configure the CRE 22 for determining content for at least one or each user 205 represented in the historical user action data. A trial combination of parameters 825 and/or parameter values can be generated to generate a trail use case 810. The trial use case 810 can be applied to the CRE 22 that has been configured on the historical user actions for the first period to generate recommendations for at least one and preferably a plurality (or all) of the users 205 reflected in the historical user action data. The historical user action data for the second period can be used to identify what content items the users 205 subsequently interacted with. The content recommendations generated for users by the CRE 22 based on the trial use case 810 can then be compared against the content that the users 205 actually subsequently interacted with from the historical user action data for the second period. The results of that comparison can be used to determine a score indicating the closeness or similarity between the content recommended by the CRE 22 based on that trial use case 810 and the content the respective user actually interacted with from the historical user action data for the second period. The trial use cases can be varied and the process iteratively repeated (or by other techniques such as goal-seek algorithms or the like) to identify which use case parameters 825 and/or parameter values lead to the closest content match to the content interacted with by users based on the historical user data from the second period.

For a new content provider, for which no previously configured or trained CRE 22 is available, this process is relatively straightforward. However, for existing content providers for which a CRE 22 is already available, then some form of "time-travel" or "roll-back" facility for reverting the CRE 22 back into the state in which it was in at the end of the first period/start of the second period may be beneficial to obtain more accurate results. By "time-travelling" the CRE 22 is set into a state the same as it was at the desired point in time (i.e. after the first period and before the second period). This could be achieved, in examples, by storing parameters required to recreate the CRE 22 as time/date stamped data and/or in a relational database that stores the CRE parameters with time/date, or by other suitable mechanisms. For example, the relational database may be formed by periodically copying the parameters of the CRE 22 and any data used to the relational database for the associated date/time. This approach could be useful, for example, to run periodically, e.g. daily, at low demand times, e.g. early morning or late at night, in order to identify best use cases 810 to deploy for the next period, e.g. the next day.

Regardless of how it might be implemented, the historical user action data can be used to automatically create use cases 810 with multiple parameters without having to set them manually in the UX engine 12. In examples, hyper-parameter optimization can be performed as part of the automated generation of the use cases 810. This may result in more effective use cases 810 and ultimately may result in a more effective content selection interface 605.

Figure 9:
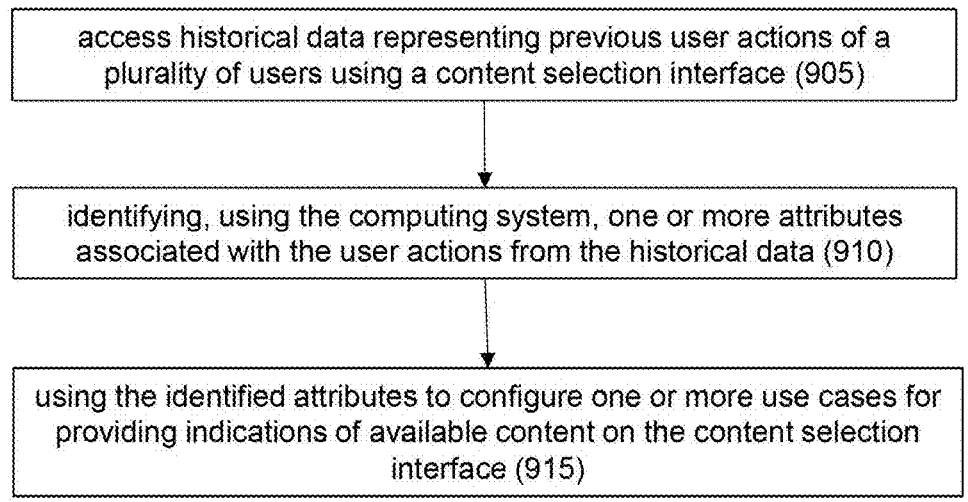
FIG. 9 is a flowchart of a method of configuring use cases.

The method by which the UX engine 12 provides guidance or automatic updating of the use cases for populating a content selection user interface based on historical data is illustrated in FIG. 9.

In step 905, the historical data representing previous user actions of a plurality of users of at least one content provider whose content is accessible through the content selection interface 605 is retrieved from the data storage 14 for historical data. As discussed above in relation to FIGS. 1 to 3, the user action data for users 205 of a content provider is collected from requests sent from user devices 40 during operation of the content selection interface on those user devices 40 over a network. This data is directly or indirectly received or obtained by the recommendation system 2 and stored in the data storage 14 for historical data.

Examples of user actions that are recorded and stored in the data storage 14 for historical data include: one or more of: selecting content associated with a use case; scrolling through content associated with a use case; hovering a cursor for greater than a threshold period over content associated with a use case; pausing scrolling for greater than a threshold period through content associated with a use case; downloading content associated with a use case; having watched at least part of content that is associated with a use case; bookmarking content associated with a use case; browsing content that is associated with a use case; recording content that is associated with a use case; adding content associated with a use case to virtual shopping basket or otherwise selecting for purchase or potential purchase; watching or listening to a trailer for content associated with a use case; playing content that is associated with a use case; purchasing content associated with a use case; clicking on or otherwise selecting content associated with a use case from a list of search results; remotely recording content associated with a use case; setting a reminder for content; liking, making a favourite or otherwise adding to a list content associated with a use case; disliking content that is associated with a use case; messaging about content associated with a use case; posting on social media about content that is associated with a use case; playing purchased content that is associated with a use case; stopping watching or playing content that is associated with a use case; and/or rating content that is associated with a use case.

In step 910, one or more attributes associated with the user actions from the historical data are identified. The user attributes could be, for example, values of one or more parameters of one or more use cases associated with at least some of the user actions represented in the historical data.

For example, the user 205 may select an item of content from a carousel comprising a group of content 620 generated by a use case 810 having certain parameters. In this case, those parameters and the values of those parameters of the use case 810 that generated the group of content 620 from which the content was selected by the user 205 are used to increment the performance score for those use cases and parameter values. So, in an example, if the user action is selection of content generated using a use case for which the genre is set as "drama", then a performance score amount indicative of a selection is added to the performance score for "genre" as a choice of parameter and to "drama" as a value of the parameter "genre". In this case, the UX engine 12 may be more inclined to recommend "genre" as a choice of parameter and to "drama" as a value of the parameter "genre" in the parameter guidance region 815 than would otherwise have been the case. However, the disclosure is not limited to this and, as indicated above, there are a large number of user actions relating to content or use cases that can be used to increment the performance scores for use cases or values of parameters of use cases. The performance scores are then subsequently used to manually or automatically select use cases and/or values of use case parameters in step 915.

In another example, the attributes can be derived from metadata associated with the at least one user action (step 910). For example, metadata associated with a content item liked by a user 205 using the content selection interface 605 may indicate that the liked item of content has a genre of "rom-com" and a language of Spanish. In this case, the performance score for the genre parameter having a value of "rom-com" may be incremented and the language parameter value of "Spanish" may also be incremented (and optionally also a cross-correlation between genre being "rom-com" and language being "Spanish"). The performance scores are then subsequently used to manually or automatically select use cases and/or values of use case parameters in step 915.

In another example, the attributes can be derived from an identification of, or other data regarding, the content giving rise to the at least one user action. For example, the recommendation system 2 may be configured to look up a database containing data on each content item and retrieve data relating to the content items such as the cast, genre, language, content delivery method and the like (step 910), and use that data to increment performance scores for use cases and/or use case parameter values. The performance scores are then subsequently used to manually or automatically select use cases and/or values of use case parameters in step 915.

Although specific values are given above, other forms of attribute from the historical user action data could be used to determine use cases and/or values of the parameters of the use cases to use for providing groups of content 620 for provision on the content selection interface 605. In addition, although the above examples are discussed in terms of calculating a performance score, the disclosure is not limited to this and other techniques for determining use cases and/or values of parameters of the use cases more suited to that corpus of users from the attributes of the user actions in the historical data could be used. For example, a machine learning or other model could be used. The machine learning or other model is trained or otherwise configured to accept the user actions from the historical data and/or the identified attributes of the user actions in the historical data as inputs. The machine learning or other model outputs use cases and/or values of parameters of the use cases most suited to that corpus of users 205 based at least in part on the user actions and/or the attributes of the user actions in the historical data, in step 915.

Once optimal use cases and/or values of the parameters of the use cases have been determined, then they can be deployed so that the CRE 22 generates content for each user according to the use cases, wherein the CRE 22 generates a group of content 620 for each use case for each user 205 or group of users 205. That is, even when the content 625 provided for a use case is personalized to a user 205, the use cases, which effectively define the algorithm or rules by which the content 625 in a corresponding group of content 620 is generated, are common to many or all of the users.

Figure 10:
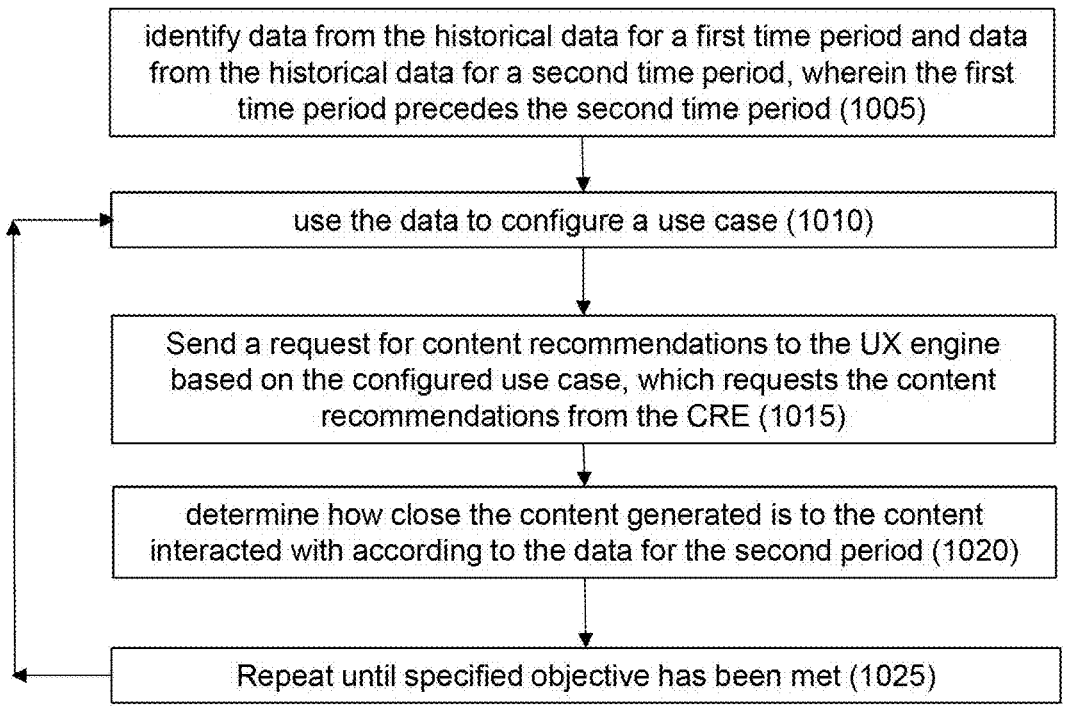
FIG. 10 is a flowchart of a method of configuring use cases.

FIG. 10 illustrates a method of generating and/or configuring use cases that is particularly suited to automatically generating and/or configuring use cases.

In step 1005, data from the historical data for a first time period and data from the historical data for a second time period is identified, wherein the first time period precedes the second time period.

In step 1010, user action data for the first (older) period is used to configure a use case. The user action data for the second period is held back and later used to measure the effectiveness of the selected use cases and values of the parameters of the use cases. If a content provider is setting up the use cases for the first time then the user action data for the first period can be used to configure the trial use case or use cases based on the user action data for the first (older) period. For example, use cases and values of parameters of the use cases can be created and/or configured in the UX engine 12 either manually or automatically or a combination of both based on the user action data for the first (older) period, for example as described above in relation to FIGS. 7 and 8.

An examples of a suitable CRE 22 is described in GB2218177.0 in the name of the present applicant, the complete content of which is incorporated by reference as if set out in full herein. The CRE 22 should be configured into a state as if was the end of the second period and before the first period. If a content provider already uses the recommendation system 2 then the CRE 22 can be "time travelled" or wound back so that it is in a state, and only has data and parameters available to it, that it would have been at the end of the second period and before the first period. This could be achieved by various different methods. For example, the historical data needed to define the CRE 22 at given points in time can be stored in a relational database and/or time/date stamped and used to recreate a previous state of the CRE 22, although other approaches could be used.

In step 1015, a request can be sent to the UX engine 12 for content recommendations based on the use case or use cases currently being configured. The use cases are applied to the CRE 22 (whilst the CRE 22 is in a state commensurate with the end of the second period and before the first period, as described above) to generate content recommendations for one or more users 205 based on the use cases.

In step 1020, the content recommendations based on the use cases for the one or more users 205 created based on the user action data for the first (older) period can be compared with the user actions actually undertaken by those users 205 from the user action data for the second period to evaluate the effectiveness of the use cases. The effectiveness depends on a closeness or similarity between the recommended content and the content that is the subject of the user actions by the respective user from user action data for the first period.

Multiple use cases can be created and their effectiveness determined, or the parameter values of use cases can be iteratively adjusted until required objective is reached (e.g. number of iterations or an effectiveness above a threshold, or an increase in effectiveness between iterations being below a threshold, or the like), in step 1025. The use case or a set number of use cases having the highest determined effectiveness can be selected for use.

In this way, a best predictive use case or set of use cases can be deployed. This process can be run periodically, e.g. each day, optionally during a quiet period for the recommendation system 2, in order to optimise the use cases for the next period, or can be performed on request or according to any other suitable rule.

This process is particularly suitable for automatically generating new use cases that are particularly configured for a given corpus of users 205 such as the users 205 of a given content provider. Techniques such as hyper-parameter optimization can be used to facilitate the automated generation.

Although various specific examples have been described above, these are provided to help understanding of the present disclosure and other possible implementations can be used. For example, although specific arrangements of systems and networks that could be used to implement the concepts disclosed herein are shown in FIGS. 1 to 3, other systems architectures could be used. For example, the UX engine 12 could be provided as a stand-alone system rather than being integrated with the content recommendation engine 22 or integrated into a content provider system rather than being provided as a separate intermediate or backend system.

Method steps described herein can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customised circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented with a user device 40 having a screen, e.g., a CRT (cathode ray tube), plasma, LED (light emitting diode) or LCD (liquid crystal display) monitor, for displaying information (e.g. the content selection interface 605) to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

As such, the above description of specific embodiments is made by way of example only. A skilled person will appreciate that variations of the described embodiments may be made without departing from the scope of the invention.

The invention claimed is:

1. A method for determining use cases for a content selection interface that provides user selectable indications of content available from a content provider according to the use cases, the indications of available content being selectable by a user to have the content provided to the user by the content provider, the method comprising, using a computing system:
    accessing, from at least one computer readable data store, historical data representing previous user actions of a plurality of users using a content selection interface;
    identifying, using the computing system, one or more attributes associated with the user actions from the historical data;
    using the identified attributes to configure one or more use cases for providing indications of available content on the content selection interface;
    identifying data from the historical data for a first time period and data from the historical data for a second time period, wherein the first time period precedes the second time period, and the configuring of the use cases comprises using the use cases identified to be associated with at least some of the user actions of the first time period to configure use cases or a content recommendation engine for providing indications of available content on the content selection interface, and
    using at least some of the user actions of the second time period to assess performance of the configured use cases, wherein the data is date and/or time stamped and the method comprises performing a wind-back to only use data, parameters and content recommendation models dated and/or time stamped for a date and/or time during the first time period.

2. The method of claim 1, wherein at least one of the attributes comprises one or more values of one or more parameters of one or more use cases associated with at least some of the user actions represented in the historical data, and the method further comprises:
    identifying, using the computing system, one or more use cases from the plurality of use cases that are associated with at least some of the user actions; and
    configuring the one or more use cases comprises using the one or more values of the one or more parameters of the one or more use cases identified to be associated with at least some of the user actions to configure the parameters of the one or more use cases for providing indications of available content on the content selection interface.

3. The method of claim 1, wherein at least one of the attributes comprises one or more or each of:
    metadata associated with the at least one user action; and/or
    an identification of, or other data regarding, the content giving rise to the at least one user action.

4. The method of claim 1, wherein:
    each use case comprises a plurality of parameters, the values of which at least partly define content of the use case; and
    the configuring of the use cases comprises using the identified attributes to select the at least one value of at least one parameter of at least one of the use cases to be configured.

5. The method of claim 1, wherein the configuring of the use cases using the identified attributes comprises configuring the use cases using a model that receives one or both of the at least the user actions and/or the one or more attributes of the user actions from the historical data and outputs one or both of: indications of the use cases and/or parameters of the use cases to be configured.

6. The method of claim 5, wherein the model comprises a machine learning model and wherein the configuring of the use case comprises training or otherwise configuring the machine learning model and/or selecting parameters thereof using at least some of the user actions and/or the attributes.

7. The method of claim 1, wherein the user actions comprise an action taken by a user using the content selection interface that relates to one or more items of content of a use case.

8. The method of claim 1, wherein the method comprises selecting, scoring, rating or ranking use cases depending on if or to what extent each use case meets one or more target criteria.

9. The method of claim 8, wherein at least one of the criteria comprises one or more of:
    how many of the user actions represented in the historical data are associated with a use case having a parameter value in common or otherwise associated with the respective use case;
    how long users interacted with a use case or content associated with a use case;

how many advertising slots associated with a use case or the content thereof were interacted with.

10. The method of claim 8, comprising providing a recommendation of one or more highest scoring, rated or ranked use cases from amongst a plurality of use cases to a user of a UX engine for configuring content selection interfaces.

11. The method of claim 8, comprising automatically selecting one or more highest scoring, rated or ranked use cases from amongst a plurality of use cases for use in a content selection interface.

12. The method of claim 8, comprising automatically setting parameters of a use case based at least in part on the parameters of one or more of the highest scored, rated or ranked use cases.

13. The method of claim 1 wherein the providing of the historical data comprises performing a wind-back that comprises using only data, parameters and content recommendation models available during the first time period.

14. The method of claim 1 wherein the database is a relational database, with data, parameters and content recommendation models provided for a plurality of dates and/or times.

15. The method of claim 1, wherein the content selection interface is a carousel based interface comprising a plurality of carousels and each carousel comprises a plurality of indications of selectable content selected using a different one of the configured use cases.

16. A system comprising processing circuitry configured to:
   access, from at least one computer readable data store, historical data representing previous user actions of a plurality of users using a content selection interface;
   access, from at least one computer readable data store, use case data defining a plurality of use cases;
   identify use cases from the plurality of use cases associated with at least some of the user actions;
   use the use cases identified to be associated with at least some of the user actions to configure use cases for providing indications of available content on the content selection interface;
   identify data from the historical data for a first time period and data from the historical data for a second time period, wherein the first time period precedes the second time period, and the configuring of the use cases comprises using the use cases identified to be associated with at least some of the user actions of the first time period to configure use cases or a content recommendation engine for providing indications of available content on the content selection interface, and
   use at least some of the user actions of the second time period to assess performance of the configured use cases, wherein the data is date and/or time stamped and the method comprises performing a wind-back to only use data, parameters and content recommendation models dated and/or time stamped for a date and/or time during the first time period.

17. A non-transitory computer-readable medium that comprises computer-readable instructions that are executable to evaluate use cases for a content selection interface in which content of at least one content provider that provides indications of available content according to the use cases, the indications of available content being selectable by a user to have the content provided by a content provider of the at least one content providers, by at least:
   accessing, from at least one computer readable data store, historical data representing previous user actions of a plurality of users using a content selection interface;
   accessing, from at least one computer readable data store, use case data defining a plurality of use cases;
   identifying, using the computing system, use cases from the plurality of use cases associated with at least some of the user actions;
   using the use cases identified to be associated with at least some of the user actions to configure use cases for providing indications of available content on the content selection interface;
   identifying data from the historical data for a first time period and data from the historical data for a second time period, wherein the first time period precedes the second time period, and the configuring of the use cases comprises using the use cases identified to be associated with at least some of the user actions of the first time period to configure use cases or a content recommendation engine for providing indications of available content on the content selection interface, and
   using at least some of the user actions of the second time period to assess performance of the configured use cases, wherein the data is date and/or time stamped and the method comprises performing a wind-back to only use data, parameters and content recommendation models dated and/or time stamped for a date and/or time during the first time period.

* * * * *